(12) United States Patent
Tafoya (10) Patent No.: US 7,413,408 B1
(45) Date of Patent: Aug. 19, 2008

(54) VIBRATION-REDUCING AND NOISE-REDUCING SPOILER FOR HELICOPTER ROTORS, AIRCRAFT WINGS, PROPELLERS, AND TURBINE BLADES

(76) Inventor: Samuel B Tafoya, 135 41st Cir. E., Bradenton, FL (US) 34208

( * ) Notice: Subject to any disclaimer, the term of this patent is extended or adjusted under 35 U.S.C. 154(b) by 0 days.

(21) Appl. No.: 11/709,613

(22) Filed: Feb. 22, 2007

(51) Int. Cl.
*B64C 11/18* (2006.01)
*B64C 11/00* (2006.01)

(52) U.S. Cl. .......................................... 416/228; 416/62
(58) Field of Classification Search ................. 416/228, 416/235, 240, 62, 100, 66; 244/215, 200, 244/213
See application file for complete search history.

(56) References Cited

U.S. PATENT DOCUMENTS 5,088,665 A * 2/1992 Vijgen et al. ................. 244/200
5,533,865 A * 7/1996 Dassen et al. ................ 416/228

* cited by examiner

*Primary Examiner*—Edward K. Look
*Assistant Examiner*—Dwayne J White
(74) *Attorney, Agent, or Firm*—Dorothy S. Morse (57) ABSTRACT

A spoiler attached to helicopter main rotor blades, tail rotor blades, propellers, aircraft wings, and machined into turbine blades, that reduces vibration and silences their operation. Also, when added to a substantial part of the trailing edges of its rotor blades, the spoiler eliminates the repetitive pop-pop sound common to current helicopter flight. Preferably, the spoiler is made from durable resilient materials that bend with resistance for high speed oscillation and it is secured on the top or bottom side, or both, of the trailing edge of a blade or wing. Further, the free edge of the spoiler exhibits a non-repeating pattern of feather-like projections that collectively break up vortex formation so that the next wing or blade traveling through the same location has clean air/fluid in which to move. In addition to noise reduction, the spoiler increases blade efficiency and wing lift.

18 Claims, 7 Drawing Sheets

PRIOR ART

TUBULAR VORTEX RING CANNOT FORM

VIBRATION-REDUCING AND NOISE-REDUCING SPOILER FOR HELICOPTER ROTORS, AIRCRAFT WINGS, PROPELLERS, AND TURBINE BLADES

CROSS-REFERENCES TO RELATED APPLICATIONS

None.

BACKGROUND OF THE INVENTION

1. Field of the Invention

This invention relates to devices and methods used for reducing and/or eliminating the tubular vortices commonly produced by rotating blades in aeronautical applications, as well as those produced by aircraft wings during flight, specifically to a spoiler made from flexible material having an irregularly-configured freely projecting distal edge that is primarily contemplated for use in eliminating the 'pop-pop' sound one hears when a helicopter main rotor is moving at speed. Elimination of such noise will provide a stealth capability to helicopters that has never before been experienced. Thus, a helicopter would be able to enter a conflict zone, and not have a hostile force anticipate its arrival solely as a result of the repetitive popping noise so familiar to everyone who has ever been within the audible proximity of a helicopter in flight. It is preferred for the spoiler to be flap-like, with a thin and flat configuration that hangs loosely or projects freely from its attached proximal surface. It is also preferred for the present invention spoiler to be made from supple, resilient, and durable non-ferrous material, such as rubber, a rubber-like material, plastic, rubber impregnated with thin steel mesh, canvas reinforced rubber, rubber composites, and other durable materials that do not prematurely fatigue as a result of repeated contact with high-speed air movement around them, and are capable of vibrating or oscillating like a stretched rubber band in the wind. Further, the material used for the present invention spoiler must be able to withstand shocks without premature deformation or rupture. It is contemplated for the resiliency of the material used for the most preferred embodiment of the present invention spoiler to be similar to that used for the mud flaps on a semi-truck. Alternative descriptions of the needed spoiler movement for the purposes of this disclosure, and which collectively give one a better understanding of the type of action taking place, are shuttering, quivering, beating, trembling, pulsating, resonating, fluttering, flapping, singing, and/or the ready ability to move quickly in up and down directions without permanent deformation or fatigue. The preferred means of connecting the present invention spoiler to the trailing edges of rotor blades, airfoils, and propellers, although not limited thereto, involves the use of one or more pre-machined grooves close to that trailing edge, one or more mounting plates, bolts, rivets, and/or adhesive. Redundant attachment methods are preferred to maintain the present invention spoiler in place on the trailing edge while it undergoes high-speed oscillation. When the spoiler material becomes worn and is no longer able to fulfill its vortex eliminating function, substitution with a replacement present invention spoiler is contemplated and easily accomplished as a part of routine maintenance procedures. It is further contemplated for the freely projecting distal edge of the present invention spoiler to have a non-repeating pattern of angular indentations which creates therebetween a plurality of feather-like projections with differing shape and pitch that bend with resistance and/or vibrate without deformation to collectively break up vortex formation as it tries to occur.

When the formation of tubular vortices is prevented at the trailing edge of a blade or aircraft wing, the noise and vibration commonly experienced in aircraft operation is significantly reduced, as the next wing or blade traveling through the same location has clean air/fluid in which to move. Thus planes can follow one another more closely during flight, and as applied in helicopter applications, the prevention of vortices by the present invention spoiler also prevents the typical 'pop-pop' sound associated with helicopter flight that results from collapse of the vortices created during the revolution of each blade and the leading edge of the next adjacent blade coming into contact with the resulting turbulence as it is washed rearward from its predecessor. Further, in addition to noise reduction, the common helicopter problem of rotor vibration, for which extensive research to reduce it has been previously conducted, is considerably reduced by use of the present invention spoiler. It absorbs blade vibration by resisting the sympathetic airframe vibration transferred from the engine to the blades. As vibration can generate great heat that prematurely destroys copper gaskets and many sealant compounds, use of the present invention spoiler to reduce vibration would obviate the need for such replacement and provide the added benefit of reduced maintenance cost. A further benefit of noise reduction is a quieter cabin for passengers and crew. In addition to noise and vibration reduction, the capability of the present invention spoiler to eliminate tubular vortices from the trailing edges of blades and airfoils also provides increased rotor and propeller efficiency, and increased wing/airfoil lift.

2. Description of the Related Art

While movie productions have fantasized about noiseless helicopter flight, in modern helicopter flight, a repetitive 'pop-pop' sound is commonly heard as the main rotor blades and tail rotor blades of gasoline-powered and turbine-powered helicopters rotate. It is the blade tips traveling at terminal velocity that create this popping sound. The turbine blades in turbine-powered helicopters similarly produce noise. While such helicopter noise contributes to the noise pollution in urban areas, the 'pop-pop' sound presents a significant problem in hostile environments, as by announcing the arrival of the helicopter in advance it makes the helicopter more vulnerable to attack. Further, as previously mentioned, vibration in helicopters is a common problem, significantly contributing to operator and parts fatigue. Some examples of dampers currently used to reduce helicopter vibration, are the Westland Flexspring vibration absorbers, the Bifilers pendulum, and containers filled with mercury. All can be eliminated by use of the present invention, with significant operational cost reduction. In addition, the decreased weight of a helicopter when these types of dampening devices are eliminated permits increased payload, and with respect to the use of mercury, the potential hazard of a mercury spill in the event of a mishap is also eliminated. Use of the present invention spoiler in aircraft can also eliminate the cost of flapping hinges, articulated shock absorbers, and specially designed rotor tips. In addition to noise reduction, rotor vibration is also considerably reduced, as well as lift and blade retard. There are no known spoiler modifications to propellers and aircraft wings having the same structure and features as the present invention, nor all of its advantages.

BRIEF SUMMARY OF THE INVENTION

Objectives and Advantages

The primary object of this invention is to reduce the noise made by the main rotor blades, tail rotor blades, and turbine blades used in helicopters. It is a further object of this invention to provide a noise-reducing spoiler that when attached to the trailing edge of a blade or wing also reduces rotor vibration, that accounts for lift and blade retard, so that lift and operation efficiency are improved. A further object of this invention is to provide a noise-reducing spoiler that extends substantially along the entire trailing edge of a rotor blade, airfoil, or propeller blade. It is also an object of this invention to provide rotors, propellers, and airfoils with replaceable spoilers made from resilient materials having irregular feather-like projections that are collectively capable of sufficient irregular high-speed vibration, fluttering, flapping, oscillating, trembling, quivering, and/or beating like the wing of a bird in flight to prevent the formation of tubular vortices. Another object of this invention is to provide spoilers for aircraft wings and propellers preferably having one edge secured to a groove or channel on the top, bottom, or both sides of the blade or wing near to its trailing edge. Further, it is also an object of this invention to provide a spoiler with a freely projecting distal edge that exhibits a non-repeating pattern of angular indentations that create feather-like projections therebetween capable of collectively breaking up vortex formation so that the next wing or blade traveling through the same location has clean air/fluid in which to move. It is a further object of this invention to provide noise and vibration reducing spoilers for rotors, propellers, and aircraft wings that are durable in construction, supple and resilient, can bend with resistance and without permanent deformation, and are able to effectively operate under a wide range of temperatures.

The present invention is a blade/wing improvement consisting of a spoiler with a freely projecting distal edge having feather-like projections formed in conjunction with an irregular pattern of angular indentations, with the spoiler made from a flexible, resilient, and supple material or materials that allows it to undergo vibrating, fluttering, flapping, quivering, and/or oscillating movement when the blade/wing moves through a surrounding air/fluid. It is secured to the trailing edges of main rotor blades, tail rotor blades, propellers, and aircraft wings, to reduce operational noise and vibration. Similar reduction of noise and vibration can be experienced when the irregular pattern of the present invention is machined into the trailing edges of turbine blades, as long as the trailing edges are made from thermal-resistant materials that do not deteriorate when exposed to extreme heat. The present invention spoiler does not lessen the formation of tubular vortices on the trailing edge of the blade or wing to which it is attached. Instead, it disrupts the formation of such vortices. Without the present invention spoiler in place, as the leading edge of a blade or wing is raised under load, a tubular vortex with a low pressure core will form at its trailing edge. The cylindrical vortex grows in diameter until it reaches a size that allows centrifugal force to shed it from the trailing edge. Once separated, the wing or blade that created the vortex advances, leaving the vortex in a position ready for collision with an upcoming blade or wing. In helicopter applications, the next approaching blade collides with the newly formed cylindrical vortex which is spinning at great speed. When collision occurs, the vortex collapses with an audible popping sound and the colliding blade or wing begins to create its own spinning vortex, causing the cycle to be repeated. Without the non-repeating angular pattern of indentations creating feather-like projections therebetween of differing size and pitch on the spoiler's freely projecting distal edge, in helicopter applications a whirling mass of air (vortex) would break off from the trailing edge of the main rotor blade when it approaches the centerline of the airframe at its forward end, or when lifting straight up. When a new vortex forms, the previous one breaks loose and lessens the blade's rotational speed. When the center of this tubular air mass (vortex) loses its centrifugal force and the atmospheric pressure takes over, the audible popping sound is created. With the formation of vortices eliminated by present invention use, the next blade does not crash into the collapsing previous vortex and more noise is eliminated, with the operational efficiency of the blade also being increased. As a result of the cleaner air provided for each following helicopter blade, the airframe using the present invention spoiler would be able to fly faster or carry more weight. When the air is cleared from turbulence between blades while they are rotating, it also becomes possible to increase the number of blades used with less power loss. A similar application of the present invention spoiler would be for an aircraft with a reciprocating engine and a propeller without notches in the trailing edges of its blades, to prevent the loud rapping and power loss that otherwise occurs when it pulls out of a dive.

Birds of prey drop from altitude to chase and catch prey with virtually no sound of turbulence. The outstretched wings of the bird of prey have feathers that extend well beyond its trailing edge in an irregular pattern of angled projections that collectively prevent a turbulent vortex tube from forming at the wing's trailing edge. You will never see a bird of prey with feathers having exactly the same pattern on the trailing edges of its wings, as the structural differences in adjacent wing feathers permit a silent approach to its prey. In contrast, one can observe that scavenger birds, such as sea gulls, give off the sound of turbulence when passing nearby. The audible puffing sound heard is similar to the popping sound of a helicopter, but much softer, and it can cause one to notice that the bird is approaching even when it is not in the observer's line of sight. Conversely, when a bird of prey such as a hawk, owl, or osprey, is disturbed and scurries to evacuate the area, very little audible sound is heard. Similar to the flight of a scavenger bird, when a helicopter of current design lifts off, one can easily hear it and can look in the direction of the popping sound to see it. Thus, a "belligerent" enemy can immediately take notice and is thereby given an opportunity to cause damage. When the popping sound is eliminated from the rotor blade by use of the present invention, and one reduces or eliminates the whine from the turbine engine blades in a similar manner, the airframe would have virtually soundless operation that would escape early detection, and be intimidating and terrorizing to an enemy. Further silencing of the whining sound of a helicopter's tail rotor would cause U.S. military vehicles of this type to be silenced even more, with the additional important benefit of increased operational efficiency.

While the description herein provides preferred embodiments of the present invention spoiler, it should not be used to limit its scope. For example, variations of the present invention, while not shown and described herein, can also be considered within the scope of the present invention, such as variations in the materials from which the present invention is made; variations in the means of spoiler attachment; the height and thickness dimensions of the spoiler and the feather-like projections on its distal edge; as well as the design of the non-repeating pattern of angular indentations. Thus, the scope of the present invention should be determined by the appended claims and their legal equivalents, rather than being limited to the examples given.

DETAILED DESCRIPTION OF THE INVENTION

Figures 1, 2, 3:
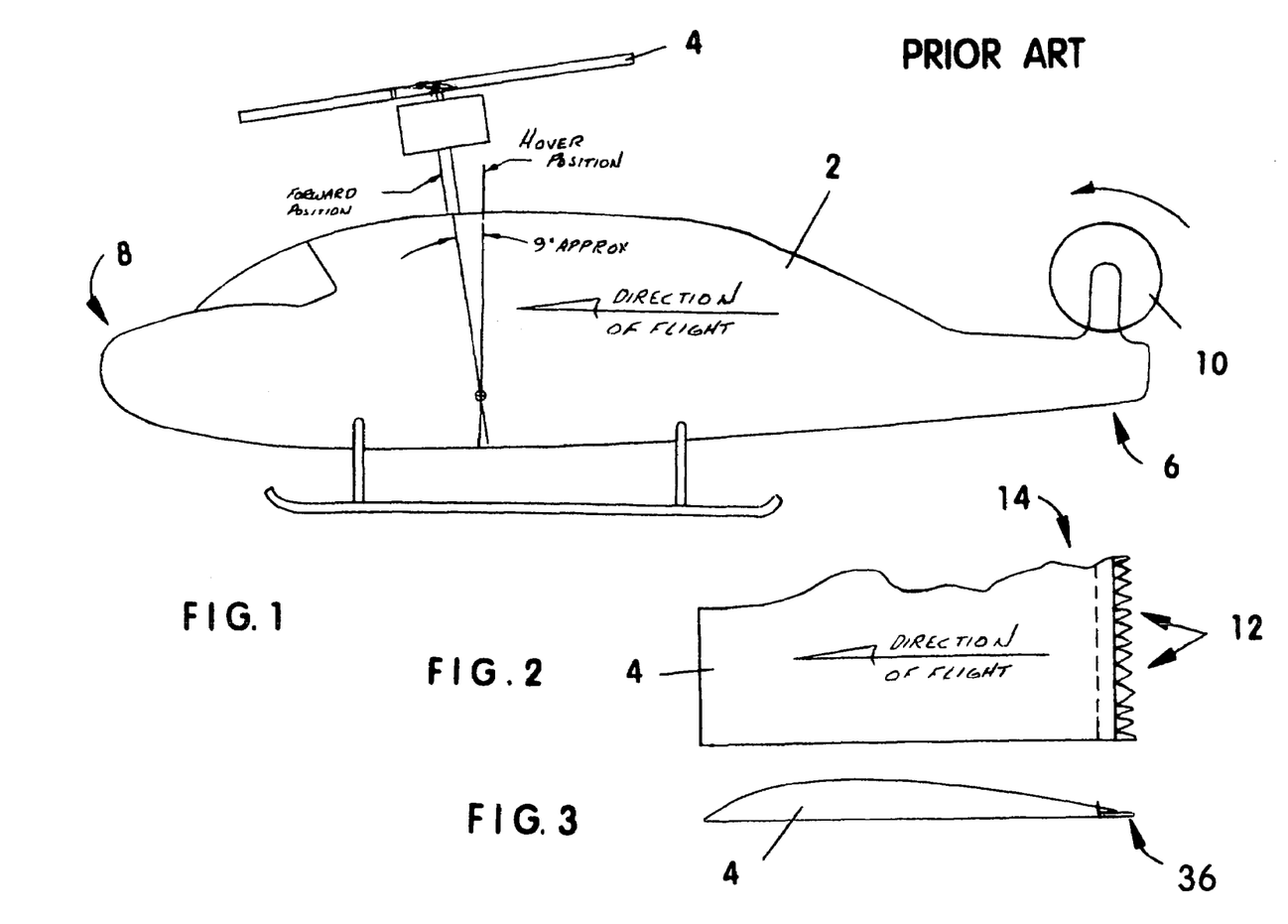
FIG. 1 is a side view of a helicopter showing the angle of its main rotor in both hover and forward positions.
FIG. 2 is a top view of a rotor blade having one preferred embodiment of present invention spoiler extending beyond its trailing edge.
FIG. 3 is a side view of a rotor blade having the same preferred embodiment of present invention spoiler shown in FIG. 2 connected to the bottom surface of the blade and extending beyond its trailing edge.
Figure 4:
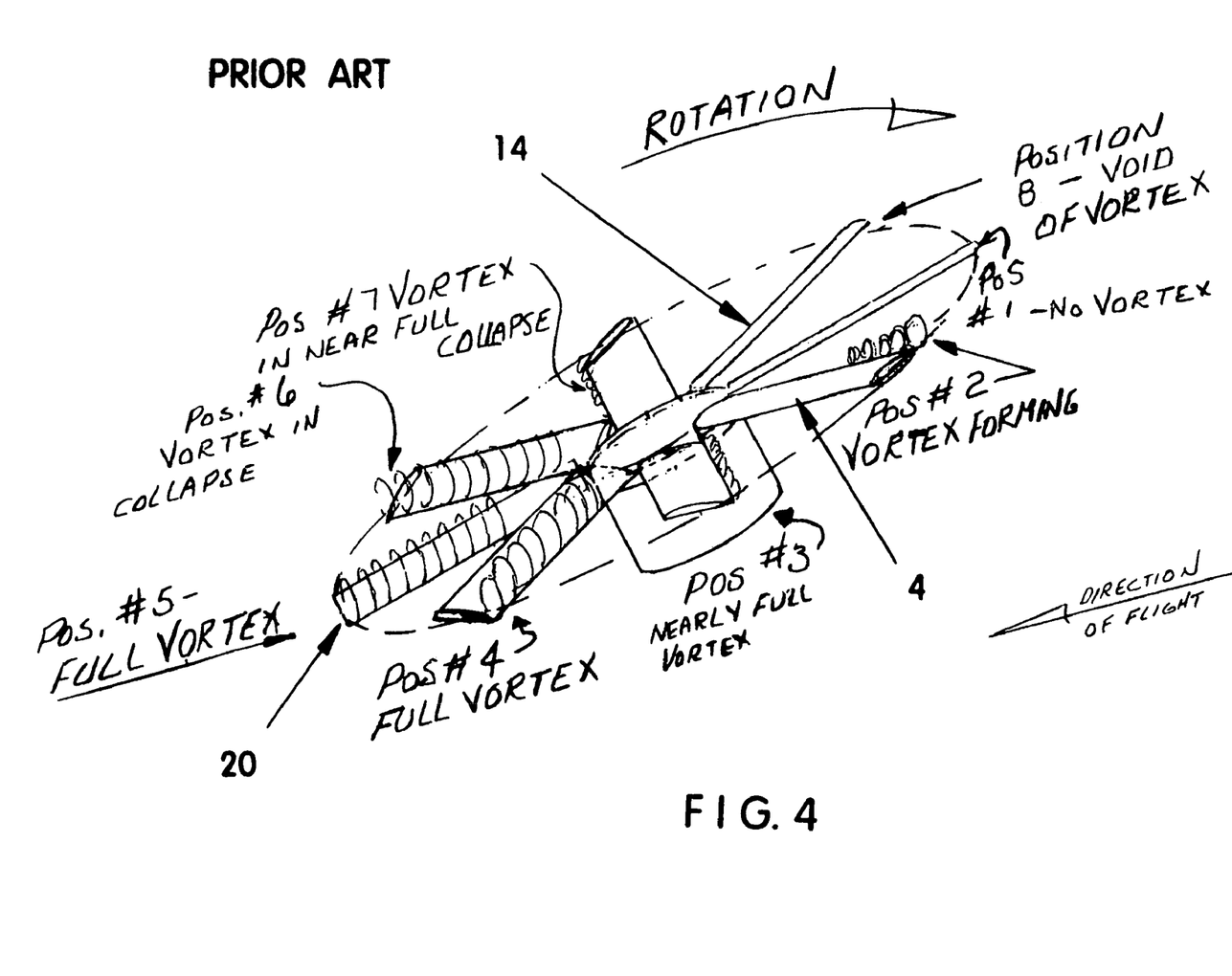
FIG. 4 is a top perspective view of a prior art blade showing its trailing edge with no present invention spoiler attached, and the resulting vortex formation and collapse at differing positions relative to the direction of flight during each of its revolutions.

The foremost purpose of the present invention spoiler (marked as the number 36 in FIG. 3) is for use with helicopter airframes 2 and other aircraft/vehicle/propeller use, to disrupt the formation of a high-speed spinning tubular vortex (shown by the number 20 in FIG. 3) that would otherwise form at the trailing edges 14 (pressure side) of the main rotor 4, tail rotor 10, turbine blade 16, or other propeller blades associated with the helicopter airframes 2 and other vehicles. In doing so, noise and vibration are significantly reduced. The present invention spoiler 36 is never attached to the leading edge (low pressure side) of a blade or airfoil. The vortex 20, typically formed when the present invention is not used, is a whirling mass of air that must break off when the main rotor blade 4 approaches the centerline of airframe 2 at its forward end 8 (position 5 in FIG. 4) during forward flight, or when the helicopter airframe 2 lifts straight up. These vortices 20 or tubes of rotating air mass are spinning with great rotational speed. Therefore, it eventually breaks loose from the trailing edge of the blade/airfoil creating it, and its rotational speed begins to lessen. This occurs (as is shown in FIG. 4) as the main rotor 4 approaches the centerline 22 of the airframe 2 at its forward end 8 (position 5 in FIG. 4). At this point, the center of the tubular air mass or vortex 20 has lost its centrifugal force and it begins to collapse. Atmospheric pressure takes over and causes an audible popping sound upon collapse. This popping sound is common in modern helicopter operation. One important object of the present invention is to prevent these vortices 20 from forming, and thus reduce the noise made during helicopter operation. Another object for, and benefit from, vortex 20 elimination is vibration reduction. The present invention non-repeating pattern of projections 12 on spoiler 36 is shown in FIGS. 2 and 3, secured to the bottom of the trailing edge 14 of main rotor blade 4. In the alternative, spoiler 36 may be secured to the top or both sides of an airfoil or blade. To accomplish its vortex 20 eliminating objective, the proposed non-repeating pattern of spoiler projections 12 on the trailing edge 14 of main rotor 4 cannot be uniform or repeating. Instead, the non-repeating pattern of projections 12 should be made from adjacent projections 12 that are dissimilar in shape and/or pitch. When such a non-repeating pattern of projections 12 is used substantially across the entire trailing edge 14 of a blade or airfoil, and the material used for projections 12 is thin, flat, flexible, supple, resilient, capable of bending with resistance, capable of bending without permanent deformation, and also capable of high-speed oscillating/shuttering movement, each projection 12 in combination with the independent movement of the other freely projecting projections 12 around it, prevent the formation of organized tubular vortices 20.

The airflow disruption that is caused by the non-repeating pattern of projections 12 provided when the present invention is used on the trailing edges 14 of the main rotor 4 attached to a helicopter airframe 2, and other blades, eliminates the formation of organized tubular vortices 20 (which have a near vacuum center). With elimination of vortex 20 formations, the next main rotor 4 or other blade moving into the same location does not crash into the turbulence remaining after a previous vortex 20 has collapsed. Thus, a second opportunity for creating a popping sound is eliminated, the first opportunity being when the vortex 20 collapses. With cleaner (non-turbulent) air provided for each rotor 4 or other propeller blade during its successive revolutions, the associated airframe 2 is able to fly faster and/or carry more weight. When the air is cleared from turbulence between successive rotor 4 or other blade revolutions, it also becomes possible to increase the number of rotors 4 or blades with less power loss. Increased propeller efficiency through use of the present invention has been demonstrated by the inventor herein using three wooden model propellers of identical diameter and pitch. Each model propeller had an overall length dimension of approximately eight inches. The first model propeller was not modified, the second model propeller was notched to provide a serrated pattern of regularly spaced angular cutout areas on its trailing edges, and the third model propeller had a thin, flat, flexible, supple, and resilient, flap/spoiler attached to the top of its trailing edges. The added flap/spoiler had irregularly-spaced cuts in its freely projecting distal edge that created a plurality of feather-like projections therebetween, each different from the next adjacent projection in shape and pitch, with each projection capable of bending independently from the others, bending with resistance, bending without permanent deformation, and having the capability of high-speed oscillating/shuttering movement. When each model propeller was rotated by the same equipment, the second model propeller had no discernable increase in air movement over the unmodified first model propeller. However, the airflow created by the third model propeller with the irregular pattern of cuts on a flexible spoiler attached to its trailing edges was noticeably increased. If the constant pattern of serrations, or serrations with a uniform pitch formed in the second model propeller had been able to lessen or disrupt vortex 20 formation, the air movement created by it would have been greater than that of the unmodified first model propeller, and it was not. A model propeller with non-flexible irregular serrations was not tested. While it may lessen tubular vortex formation, it is the successfully tested irregular projections 12 made from flexible material that are used in the present invention to prevent vortex 20 formation. Rotor blades 4 modified with a uniform pattern of serrations still makes noise, and performance is not improved, since the next approaching blade must bite into the vortex 20 formed by the immediately preceding blade moving into the same location, a vortex which comprises part vacuum and part air.

It is interesting to note that birds of prey drop from altitude to the prey with virtually no sound of turbulence. It is also noteworthy that the outstretched wings of the bird of prey have feathers that extend well beyond its trailing edge, preventing a turbulent vortex tube from forming. One can observe that scavenger birds, such as sea gulls, give off the sound of turbulence when passing nearby. The sound can cause one to easily notice this type of bird as it approaches. The puffing sound caused during scavenger bird flight is similar to the popping sound of a helicopter, but much softer. In reference again to birds of prey, when they are disturbed and scurry to evacuate an area, very little audible sound is heard. This pertains to hawks, owls, osprey, and the like. When a helicopter of current design lifts off, one can easily hear it and can look in the direction of the popping sound to locate it. Thus, a "belligerent" enemy can immediately take notice and try to cause damage. When the popping sound is eliminated from the main rotor 4 by use of the present invention spoiler 36, and one also reduces or eliminates the whine from associated turbine engine blades 16 in a similar manner by adapting the present invention spoiler 36 structure to the trailing edges 14 of the foil-shaped turbine blades 16 on the Christmas-tree inserts 18 typically used (see FIG. 8), the helicopter airframe 2 would have virtually soundless operation that would be intimidating and terrorizing to an enemy. Further eliminating the whining sound of a helicopter's tail rotor 10 by further use of the present invention spoiler 36 on its trailing edges 14 would cause vehicles of this type to be silenced considerably, along with the added bonus increased operational efficiency.

FIG. 1 shows a prior art helicopter airframe 2 and the angle of its main rotor 4 in both hover and forward flight positions. For later reference in the ensuing disclosure, the forward end of airframe 2 is designated by the number 8, and its rearward end is designated by the number 6. Also, a left-directed arrow centered within the illustration of airframe 2 shows the projected direction of forward flight for airframe 2, with a curved arrow over tail rotor 10 showing a counterclockwise direction of rotation. The forward flight position of main rotor 4 is shown to be approximately nine degrees of arc forward from the hover position. In FIG. 4, eight blade positions are marked relative to the airframe 2 and used in FIGS. 3 and 4 to explain the formation of vortices 20 by one main rotor 4 blade when it rotates clockwise during one complete revolution. A curved arrow above main rotor 4 in FIG. 4 shows its clockwise direction of rotation during forward flight of airframe 2. In the alternative, if rotor 4 rotated in the opposite counterclockwise direction, the eight positions identifying the phases of vortex 20 formation and collapse would be reversed. Blade position 1 is in line with the centerline 22 of airframe 2 at its rearward end 6, with the trailing edge 14 of main rotor 4 void of any vortex 20 formation at position 1. Blade position 2 is where rotor 4 moves away from rearward end 6 and it is possible for a vortex 20 to start forming on trailing edge 14. Blade position 3 is perpendicular to the centerline 22 of airframe 2 with main rotor 4 continuing to move from rearward end 6 toward forward end 8, and where nearly full vortex 20 formation will occur on the trailing edge 14 of main rotor 4. Blade position 4 is where the main rotor blade 4 moves further toward the forward end 8 of airframe 2 and any vortex 20 formation is nearly at a maximum. Blade position 5 is in line with the centerline 22 of airframe 2 at its forward end 8, with vortex 20 formation at its maximum and ready for collapse. In blade position 6 main rotor blade 4 moves away from forward end 8 and any vortex 20 produced is already in a state of collapse. Blade position 7 is perpendicular to the centerline 22 of airframe 2 moving from forward end 8 toward rearward end 6, with any vortex 20 in near full collapse. In blade position 8 the main rotor blade 4 moves further toward rearward end 6 and is void of any vortex 20 formation. It should be noted that for simplicity of illustration, FIGS. 5 and 6 each show circular rotation and the successive positions in one revolution of a single main rotor blade 4, not multiple blades 4, even though during actual operation multiple blades 4 is expected.

FIGS. 2 and 3 show differing views of the same blade 4 with an attached present invention spoiler 36. FIG. 2 shows the top view of one main rotor blade 4 having a non-repetitious pattern of feather-like projections 12 on its trailing edge 14, as a result of spoiler 36 attachment, while FIG. 3 shows a side view of spoiler 36 being attached to the underside surface of trailing edge 14. Spoiler 36 can attached during main rotor blade 4 manufacture, or retrofitted to its trailing edge 14. The left-directed arrow centrally within the illustration shows the direction of flight. Preferably for noise reduction, the non-repetitious pattern of feather-like projections 12 is incorporated fully across trailing edge 14. In the alternative where vibration is more of a concern than noise, the non-repetitious pattern of feather-like projections 12 could be incorporated in part across trailing edge 14. However, for most contemplated purposes, non-repetitious pattern of feather-like projections 12 is incorporated in substantial part across trailing edge 14. Also preferably for most effective function, trailing edge 14 should be all one piece, not jointed or butted. Although not shown, the present invention spoiler 36 can be secured to either the top or bottom of trailing edge 14, or both.

Figure 5:
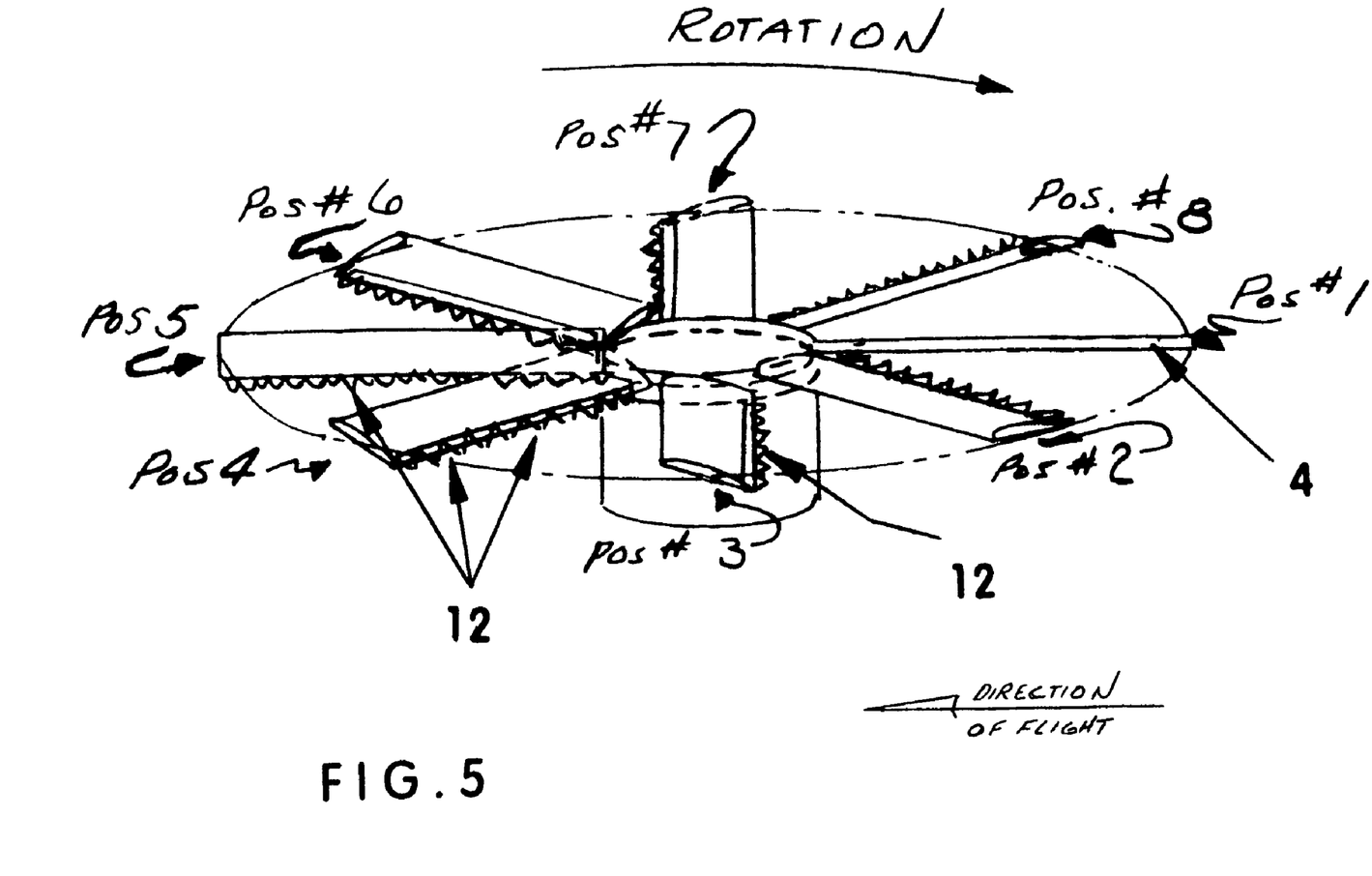
FIG. 5 is a top perspective view of a blade at differing positions relative to the direction of flight during one revolution, with a preferred embodiment of the present invention attached to its trailing edge and no vortices being formed.

FIGS. 4 and 5 respectively show rotor 4 rotation wherein vortices 20 are formed, and the elimination of vortices 20 when the present invention spoiler 36 is used. Curved arrows near the top of both illustrations show the clockwise direction of rotation for rotor 4, relative to the marked positions 1-8 where vortex 20 formation can occur. FIG. 4 shows no feather-like projections 12 on the trailing edge 14 of main rotor 4. Therefore, as identified in FIG. 4, in blade position 1 (which is in line with the centerline 22 of airframe 2 at its rearward end 6 as shown in FIG. 5) and with respect to the clockwise rotation noted for main rotor 4, the trailing edge 14 of main rotor 4 is void of any vortex 20 formation. In blade position 2, a vortex 20 starts forming on the trailing edge 14 of main rotor 4. By the time the same main rotor blade 4 gets to blade position 3, a nearly full vortex 20 is formed on the trailing edge 14 of main rotor 4. In blade positions 4 and 5 full vortex 20 formation occurs. However, once the main rotor 4 reaches blade position 5, vortices 20 are ready for collapse. In blade positions 6 and 7 vortices 20 are in collapse, until blade position 8 is reached, where trailing edge 14 is again void of vortex 20 formation. In contrast, FIG. 5 shows a main rotor blade 4 having a non-repeating pattern of feather-like projections 12 on its trailing edge 14 and the same clockwise rotation shown in FIG. 4. In all of the same eight blade positions, no vortex 20 formation is evident. As noted above, FIGS. 4 and 5 each show multiple positions of one main rotor blade 4 for a helicopter airframe 2, and not multiple blades 4. Thus, when multiple main rotor blades 4 are present, it can easily be seen from FIG. 4 how the next successive blade 4 would encounter vortex 20 turbulence. Even if only one additional blade 4 is used in a position directly opposed to that of the first blade 4, one can see from the illustration in FIG. 4 that when a second blade 4 would travel from blade positions 1-5, during its travel from blade positions 2-5 it would encounter vortex 20 turbulence created by the first blade traveling though those same blade positions 2-5, resulting in power loss. Thus, when the trailing edge 14 of a helicopter rotor 4 does not have the non-repeating pattern of feather-like protrusions 12 of the present invention spoiler 36 added to it, when additional blades 4 are added, the formation of vortices 20 becomes more voracious. Whereas, with the addition of the present invention spoiler 36 to the trailing edges of all blades 4 used, cleaner (undisturbed) air is provided for a following blade 4, thus allowing airframe 2 to fly faster or carry more weight. Further, when the air is cleared from turbulence between rotating blades 4, it then becomes possible to increase the number of blades 4 used with less power loss.

Figures 6, 7, 8:
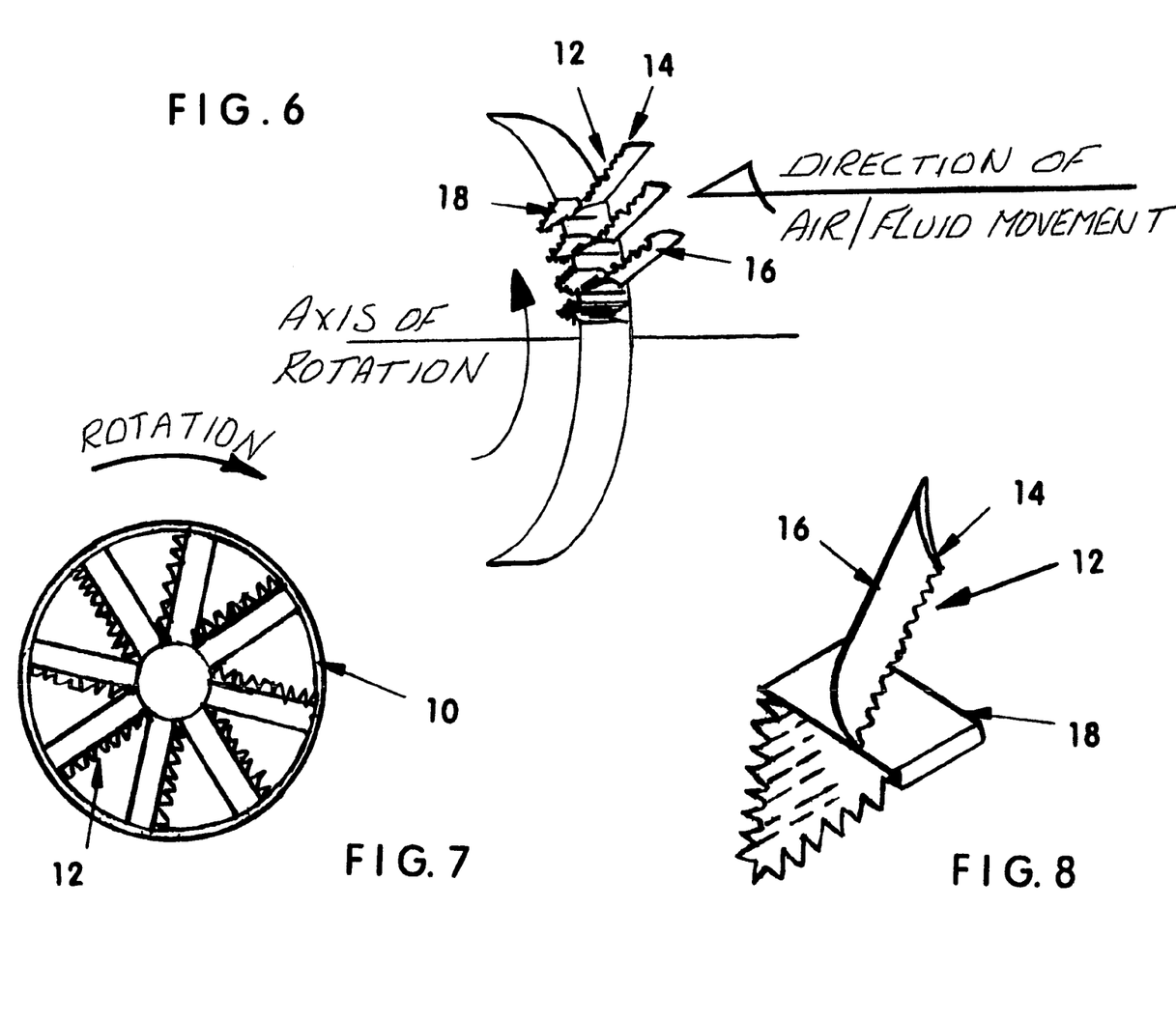
FIG. 6 is a perspective view of a preferred embodiment of vortex eliminating present invention spoiler in being applied to turbine blades.
FIG. 7 is a front view of a helicopter tail rotor with its trailing edges having a preferred embodiment of present invention vortex eliminating spoiler attached thereto.
FIG. 8 is an enlarged view of one of the turbine blades in FIG. 6.

FIG. 7 illustrates the use of the present invention spoiler 36 with its non-repeating pattern of feather-like projections 12 being applied to all of the individual blades of the tail rotor 10 of a helicopter airframe 2. As marked in FIG. 7 by a curved arrow, it is anticipated for tail rotor 10 to have a clockwise rotation when feather-like projections 12 are positioned as shown. When the present invention non-repeating pattern of feather-like projections 12 is applied to the trailing edges 14 of both the main rotor 4 and the tail rotor 10 associated with a helicopter airframe 2, noise levels during the operation of airframe 2 are substantially reduced, as is vibration. Since FIG. 7 is a relatively small representation of a tail rotor 10, details of the attachment of spoiler 36 with its non-repeating pattern of feather-like projections 12 to tail rotor 10 is omitted for clarity of illustration.

FIGS. 6 and 8 show vortex 20 eliminating present invention spoilers 36 with their pattern of feather-like projections 12 being applied to the trailing edges 14 of foil-shaped turbine blades 16 on Christmas-tree inserts 18. FIG. 6 shows several successively positioned turbine blades 16, while FIG. 8 shows an enlargement of one turbine blade 16. The curved arrow to the left of the turbine blades 16 in FIG. 6 shows the direction of their rotation around the horizontally-extending line designated as the axis of rotation, while the left-directed arrow in the right side of the illustration shows the direction of air/fluid movement across turbine blades 16. Thus, when the present invention non-repeating pattern of feather-like projections 12 is applied to the trailing edges 14 of the main rotor 4 and tail rotor 10, and also to associated turbine blades 16, it can be understood that noise and vibration levels during the operation of a turbine-powered helicopter airframe 2 would be even further reduced. In FIGS. 6 and 8, details of the attachment of spoiler 36 with its non-repeating pattern of feather-like projections 12 to turbine blades 16 are omitted for clarity of illustration. When the present invention irregular pattern of feather-like projections 12 is machined into the trailing edges of turbine blades 16, noise and vibration reduction is experienced. An attached spoiler 36 can only be associated with turbine blades 16 if its trailing edges 14 are made from thermal-resistant materials that do not deteriorate when exposed to extreme heat.

Figures 9, 10, 11:
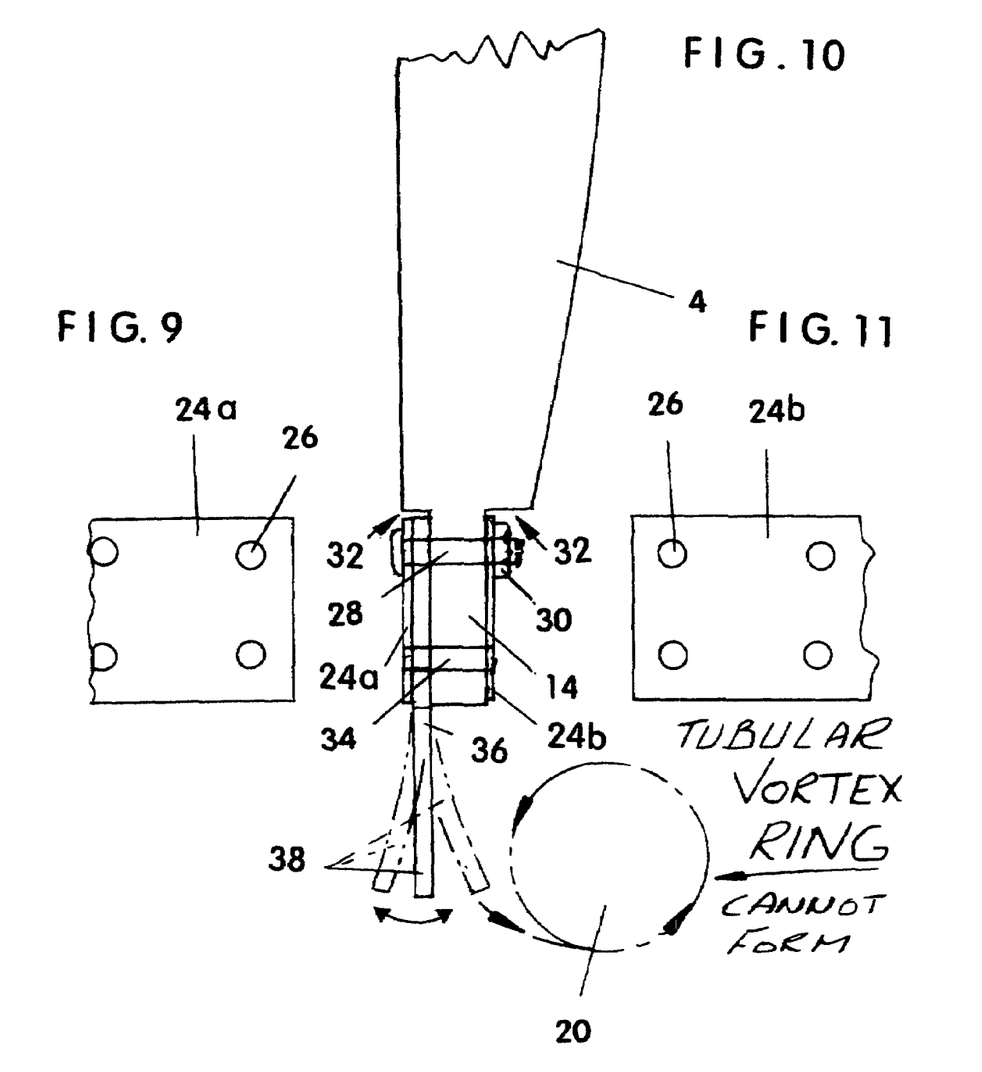
FIG. 9 is a plan view of a mounting plate used against the exposed side of a present invention spoiler during in its attachment to the trailing edge of a rotor blade, as shown in FIG. 10.
FIG. 10 is a side view of a rotor blade having a present invention spoiler attached thereto with self-locking bolts.
FIG. 11 is a plan view of a second mounting plate used against a groove in the trailing edge of a rotor blade, as shown in FIG. 10, when a present invention spoiler is attached to the opposed side of the trailing edge.
Figure 12:
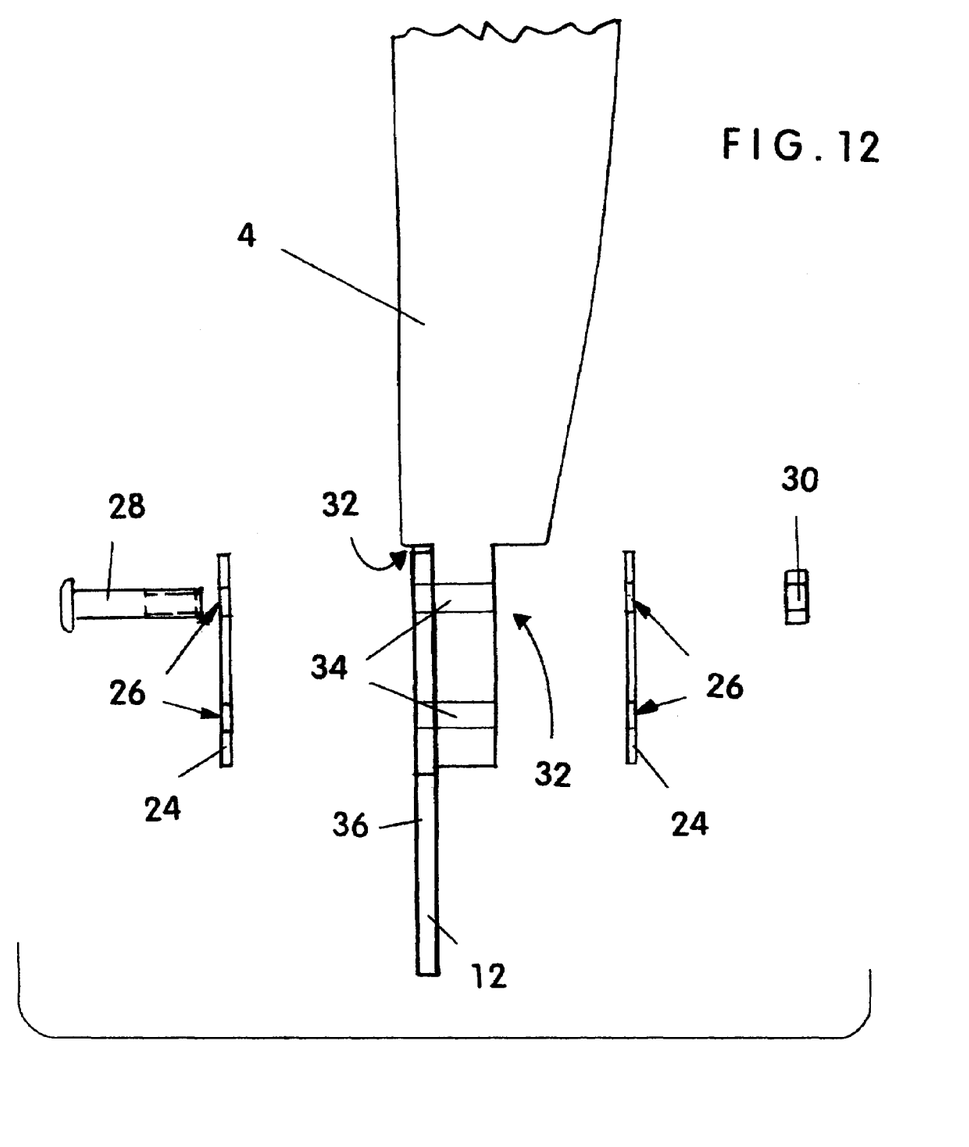
FIG. 12 is an exploded view of the assembly of a present invention spoiler to a rotor blade.

FIGS. 9-12 show attachment of a present invention spoiler 36 to a main rotor blade 4 using two mounting plates 24, each secured to the opposed side of blade 4 from the other. FIG. 11 is a side view of a rotor blade 4 having a present invention spoiler 36 attached to grooves 32 in its trailing edge 14 with bolts 28 extending through bores 34. Self-locking bolts 28 are preferred for a more secure connection of spoiler 36 during the repeated high-speed oscillating/shuttering movement of its freely projecting distal end (represented by the number 38 in FIG. 10). Since each feather-like projection 12 on distal end 38 moves independently from the next adjacent projection 12, in combination projections 12 are able to break up and thereby eliminate blade 4 power loss that would otherwise result in a blade 4 encountering the turbulence of a vortex 20 from a another blade 4 immediately preceding it in the same airspace. In contrast, FIGS. 9 and 11 are plan views respectively of a mounting plate 24a used against the exposed side of a present invention spoiler 36 during in its attachment to the trailing edge 14 of a rotor blade 4, and a second mounting plate 24b used against a groove 32 in the trailing edge 14 of a rotor blade 4. The use of mounting plates 24 over the thin and supple material of spoiler 36 is preferred to reduce the opportunity for premature separation of the thin and supple material of spoiler 36 around attached bolts 28 during the high-speed oscillating/shuttering movement that spoiler 36 repeatedly undergoes. FIGS. 9 and 11 each show multiple bores 26 respectively through mounting plates 24a and 24b, while for illustrative purposes, FIG. 10 only shows one bolt 28 with a self-locking nut 30 securing spoiler 36 to tailing edge 14. During actual connection of a present invention spoiler 36 to the trailing edge of a main rotor blade 4, one bolt 28 with a self-locking nut 30 would be secured through each bore 26 in mounting plates 24a and 24b, and also secured through complementary positioned holes 34 through trailing edge 14. FIG. 12 is an exploded view of the same assembly of a present invention spoiler 36 to a rotor blade 4, which is shown in FIG. 10.

Figure 13:
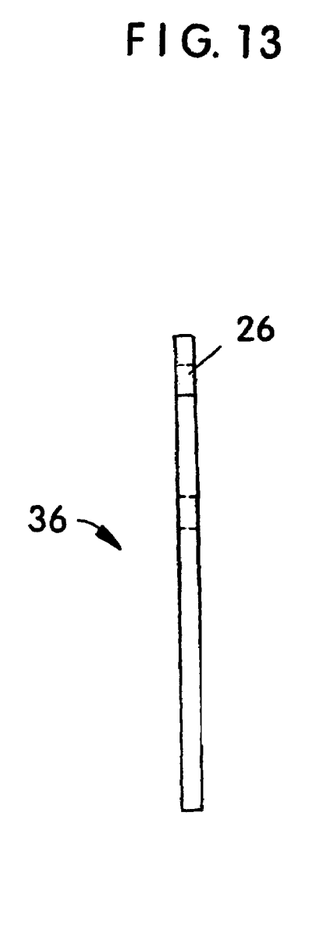
FIG. 13 is a side view of a present invention spoiler shown in FIG. 14.
Figure 14:
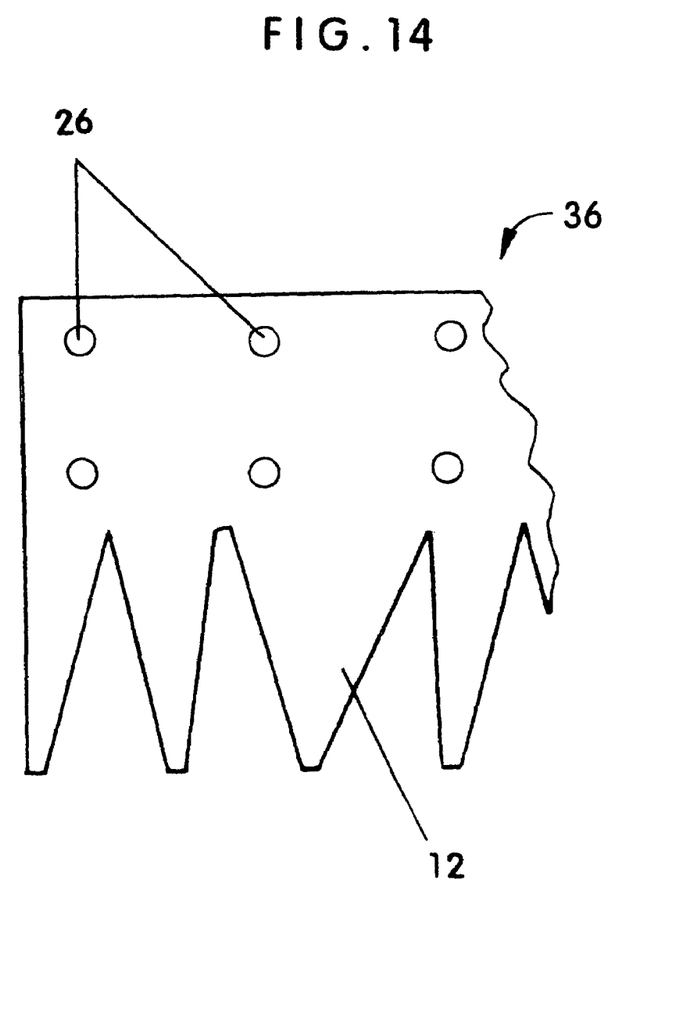
FIG. 14 is a plan view of a present invention spoiler having a non-repeating pattern of angular indentations.

FIGS. 13 and 14 show an enlarged view of a portion of a preferred embodiment of one present invention spoiler 36. FIG. 13 is a side view of present invention spoiler 36, while FIG. 14 is a plan view. Both FIGS. 13 and 14 show spaced-apart holes 26 through spoiler 36. FIG. 14 shows that it is contemplated for holes 26 to be evenly spaced across spoiler 36. FIG. 14 further shows the non-repeating pattern of featherlike projections 12 that are different in size and pitch from the next adjacent projections 12. In combination with the ability of each projection 12 to bend independently from other projections 12, allow projections 12 a capability to break up vortices 20 as they start to form to eliminate vortex 20 formation that would otherwise cause power loss as successive rotating blades 4 travel through the same air space.

The use of the present invention non-repeating pattern of feather-like projections 12 to the trailing edges 14 of rotor 4 blades, tail rotor blades 10, and also to the trailing edges 14 of turbine blades 16, not only will noise be eliminated during the operation of a helicopter airframe 2 to provide a quieter cabin for passengers and crew, operational vibration will also be reduced considerably. Vibration is a significant problem in helicopter operation. Although not shown, the current use of dampeners, such as the Westland Flexspring vibration absorbers, the Bilifers pendulum, and the use of mercury containers can be discontinued once the present invention spoiler 36 is installed on trailing edges 14. Not only is the danger associated with a mercury spill in the event of a mishap avoided, the space formerly occupied by the heavy mercury is freed for additional payload. The present invention also eliminates the need for flapping hinges, articulated shock absorbers, and the use of specially designed rotor/wing tips in aircraft applications. Experimental tests have shown that an airfoil without the present invention spoiler 36 modification shakes and vibrates out of sequence. However, once a spoiler 36 having a non-repeating pattern of feather-like projections 12 is attached to the same airfoil under the same high velocity airflow conditions, the former vibration is eliminated and the airfoil remains at a quiet position. The present invention spoiler 36 as applied to the trailing edges 14 of aircraft wings and tails would also allow aircraft to follow each other down runways at closer distances, when needed, since wing tip turbulence would not produce the vortices 20 that they now do on current aircraft. The danger of wing tip turbulence (vortices 20) to small aircraft is well known and documented. Reduced wing vibration as a result of eliminated vortices 20 would also be a benefit when the present invention spoiler 36 is incorporated into aircraft, resulting in less noise in the cabin, as well as reduced or delayed structural damage which would reduce maintenance cost. Further, use of the present invention reduces airframe 2 vibration, however, some vibrations will remain. Therefore, it is contemplated for the present invention spoiler 36 to be used on airframes 2 with asbestos gaskets in place of copper seals and lubricants, as vibration generates heat that destroys copper gaskets and almost all sealant compounds. Since asbestos absorbs heat, it will not allow leaks to form. Further, asbestos absorbs sound, which will make an aircraft cabin more comfortable. Maintenance will also be reduced by this application. Safety to persons on board airframe 2 and maintenance personnel will not be compromised if manufacturing precautions are taken when making such seals to prevent asbestos fibers from becoming released from the seals during routine use.

I claim:

1. A replaceable spoiler for the trailing edges of blades and airfoils used for preventing the formation of an organized Karmen vortex on the top surface of the trailing edge where it would otherwise become a target for the next blade or airfoil entering the same air space and create undesired noise and vibration, said spoiler comprising:

a substantially thin and elongated flap made from resilient and flexible material that bends with resistance and is capable of high-speed oscillating movement without permanent deformation, said flap also having a distal edge with a plurality of projections each comprising a shape and pitch different from the next adjacent one of said projections, with said projections collectively defining a non-repeating pattern of angular indentations that when attached to a trailing edge directs airflow under the trailing edge rearward and downward to create disorganized discharge that will not sustain vortex formation.

2. The spoiler of claim 1 wherein said flap extends fully across the trailing edge to which it is secured.

3. The spoiler of claim 1 wherein said proximal surface is attached to rotors, propeller blades, and airfoils via attachment means selected from a group consisting of grooves, pre-machined grooves, rivets, bolts, self-locking bolts, adhesives, and bonding materials.

4. The spoiler of claim 1 wherein said proximal surface is attached to the trailing edges of rotors, propeller blades, and airfoils via at least one groove selected from a group consisting of grooves made in the top surface of a trailing edge and grooves made in the bottom surface of a trailing edge.

5. The improvement of claim 1 as applied to helicopters with at least two tail rotor blades, wherein said flap is secured to each of said at least two main rotor blades as a result of which noise and vibration of said helicopter during its operation are reduced.

6. The spoiler of claim 1 as applied to helicopters, winged aircraft, helicopters with a turbine blade system, winged aircraft with a turbine blade system, and marine vehicles with a turbine blade system, wherein said flap is secured to each of said at least two main rotor blades as a result of which noise and vibration of said helicopters, aircraft, and marine vehicles are reduced.

7. The spoiler of claim 1 as applied to helicopters, aircraft, and marine vehicles with at least one airfoil surface, wherein said projections are incorporated into said at least one airfoil surface whereby noise and vibration of said helicopters, aircraft, and marine vehicles are reduced.

8. The spoiler of claim 1 as applied to helicopters with at least two main rotor blades, wherein one of said flaps is secured to each of said at least two main rotor blades as a result of which noise and vibration of said helicopter during its operation are reduced.

9. The spoiler of claim 8 as applied to helicopters with at least one tail rotor, wherein said projections are incorporated into said at least one tail rotor whereby noise and vibration of said helicopter are reduced.

10. The spoiler of claim 9 as applied to helicopters with a turbine blade system, wherein said projections are is incorporated into said turbine blade system whereby noise and vibration of said helicopter are reduced.

11. The spoiler of claim 8 as applied to helicopters with a turbine blade system, wherein said projections are incorporated into said turbine blade system whereby noise and vibration of said helicopter are reduced.

12. A method for preventing the formation of an organized Karmen vortex on the top surface of the trailing edge where it would otherwise become a target for the next blade or airfoil entering the same air space and create undesired noise and vibration, said method comprising the steps of:

providing a substantially thin and elongated flap made from resilient and flexible material that bends with resistance and is capable of high-speed oscillating movement without permanent deformation, said flap also having a distal edge with a plurality of projections each comprising a shape and pitch different from the next adjacent one of said projections, with said projections collectively defining a non-repeating pattern of angular indentations; and attaching said flap to a trailing edge so that said flap directs airflow under the trailing edge rearward and downward to create disorganized discharge that will not sustain vortex formation.

13. The method of claim 12 further comprising the steps of providing a spoiler having a non-repeating feathered pattern, and attaching said spoiler to said trailing edge.

14. The method of claim 12 wherein said non-repeating pattern is incorporated fully across said trailing edge.

15. The method of claim 12 as applied to helicopters with at least one rotor, wherein said projections are incorporated into said at least one rotor whereby noise and vibration of said helicopter are reduced.

16. The method of claim 12 as applied to helicopters with at least one tail rotor, wherein said projections are incorporated into said at least one tail rotor whereby noise and vibration of said helicopter are reduced.

17. The method of claim 12 as applied to helicopters, aircraft, and marine vehicles with a turbine blade system, wherein said projections are incorporated into said turbine blade system whereby noise and vibration of said helicopters, aircraft, and marine vehicles are reduced.

18. The method of claim 12 as applied to helicopters, aircraft, and marine vehicles with at least one airfoil surface, wherein said projections are incorporated into said at least one airfoil surface whereby noise and vibration of said helicopters, aircraft, and marine vehicles are reduced.

\* \* \* \* \*